(No Model.) 2 Sheets—Sheet 2.

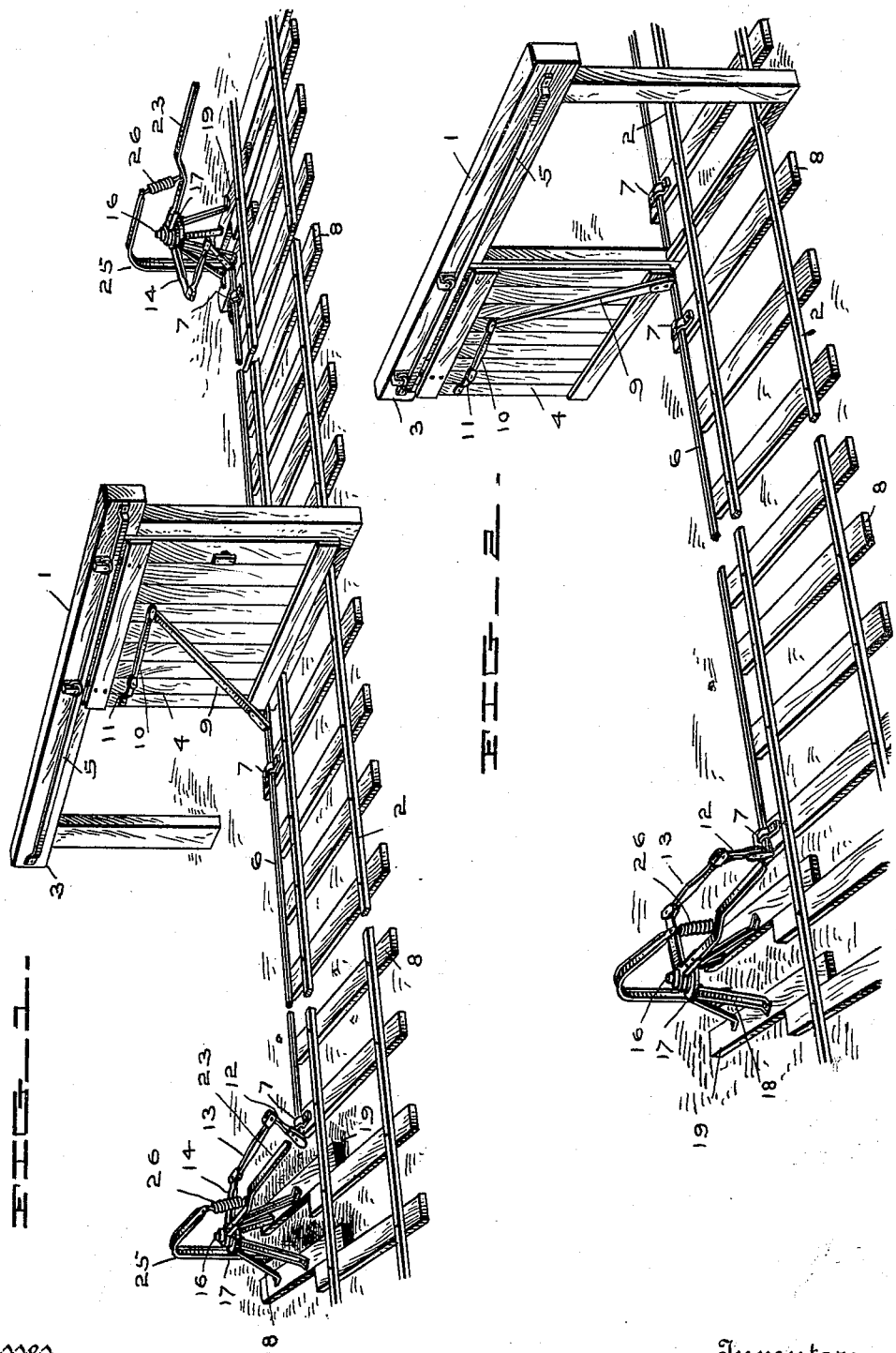

G. J. HERTH & G. BONENBERGER.
MINE TRAP DOOR.

No. 521,979. Patented June 26, 1894.

Witnesses
H. C. Nelson
C. Carson

Inventors
George J. Herth,
George Bonenberger,
By Attorney
H. B. Nealy.

UNITED STATES PATENT OFFICE.

GEORGE J. HERTH AND GEORGE BONENBERGER, OF EVANSVILLE, INDIANA.

MINE TRAP-DOOR.

SPECIFICATION forming part of Letters Patent No. 521,979, dated June 26, 1894.

Application filed April 2, 1894. Serial No. 505,995. (No model.)

*To all whom it may concern:*

Be it known that we, GEORGE J. HERTH and GEORGE BONENBERGER, citizens of the United States, residing at Evansville, in the county of Vanderburg and State of Indiana, have invented certain new and useful Improvements in Mine Trap-Doors; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to new and useful improvements in mine trap doors and more particularly to one of that class that is used in mines to control or cut off air currents from the different entries or rooms, and which is automatic in operation, being opened by a car passing through the entry on a track from either direction and is also automatically closed after the passage of such car through the trap door.

Figure 3:
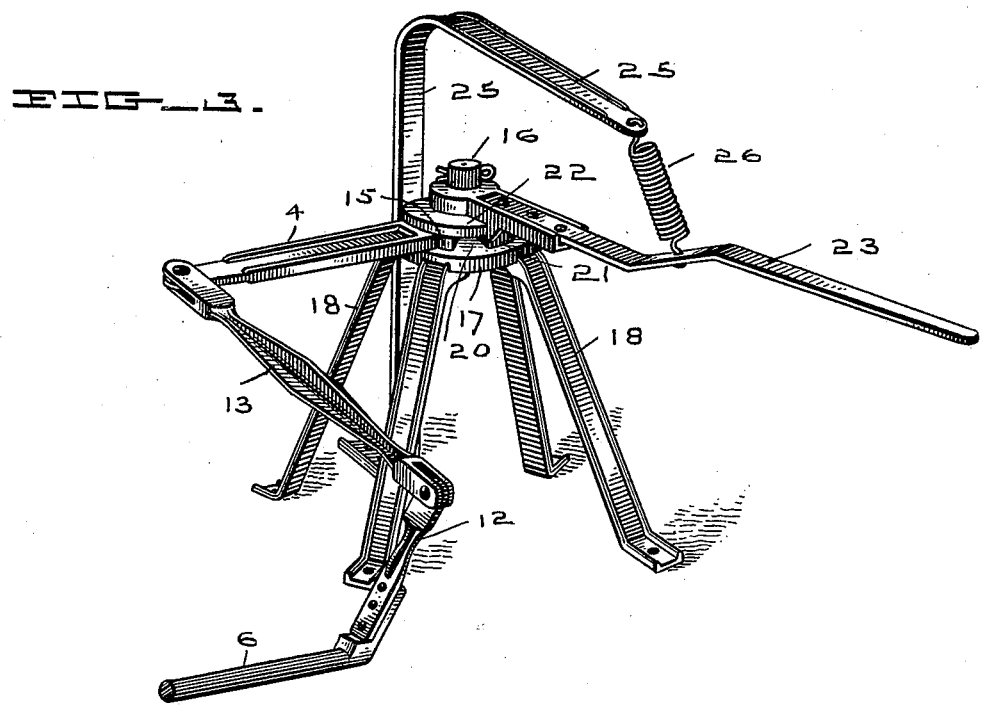
Figure 4:
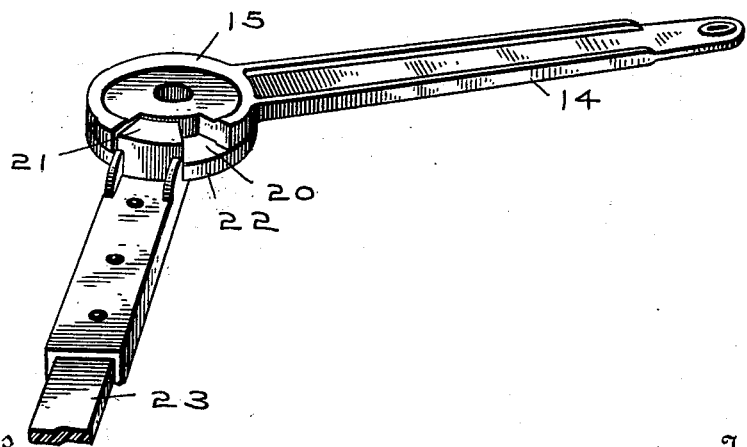

In the drawings, Figure 1 is a perspective view of our improved trap door and its operating mechanism, the door being closed. Fig. 2 is a similar view, one end of the operating mechanism being broken away and the door shown opened. Fig. 3 is an enlarged detail perspective view of the tripping mechanism, there being one of these on each side of the door. Fig. 4 is a detached under side perspective view of the tripping arm and its lever showing the connection of the two, the former partly broken away.

In detail, 1 is a frame work supported across the track 2 in an entry of a mine the inner end 3 of the framework extending into a recess cut in the wall of the entry for its reception, the recess being large enough to allow the door 4 to be pushed back into it when opened. The door 4 has the usual hangers on its top in which are carried wheels which run on a horizontal track 5 on the upper cross piece of the framework, 1.

6 is a shaft or rod having bearings in boxes 7 secured to the outer ends of the cross ties 8 on one side of the track 2, the shaft 6 being parallel with the track and extending under the door and to any desired distance on each side.

To the shaft 6 on one side of the door is rigidly secured in any desired manner, an operating arm or lever 9, its upper end having pivoted to it a link 10 which is in turn pivoted to a bracket 11 secured to the trap door near its top.

To each of the extreme ends of the shaft 6 and just beyond the outer boxings 7 is rigidly secured a crank 12, which is preferably bolted to the bent and flattened end of the shaft, the two cranks 12 being preferably in a line with the operating lever 9.

As shown in Fig. 3 (where the tripping mechanism on the right hand side of the trap door is shown) the outer end of the crank 12 is pivoted to one end of a link 13 the other end of the link being pivoted to the end of the horizontal pivoted lever 14. The lever 14 is pivoted or loosely mounted at its enlarged end 15 on the vertical pin or pintle 16 formed on a plate 17 which is preferably supported on feet or legs 18 bolted to timbers 19 in the ground, or they may if desired be bolted to extended cross ties. The enlarged end 15 of the lever 14 forms a hub which turns on the pin 16 the hub being cut out or having a recess or slot at 20 (shown in Figs. 3 and 4) in line with a lug or projection 21 formed on the hub or enlarged end 22 of the trip arm 23. This trip arm is preferably bolted to its hub or projection as shown, and its hub 22 is pivoted or loosely mounted on the vertical pin or pintle 16 and above the lever 14, the lug 21 lying in the recess 20 and being but about half as wide as such recess. The trip arm 23 and lever 14 are preferably retained in place on the pin 16 by a spring pin 24 which passes through the end of the pin 16.

25 is an arm which extends up vertically behind each of the tripping mechanisms and overhangs the same, in a line at right angles to the track 2, and 26 is a coiled spring, one end of which is attached to the overhanging end of the arm 25, the other end of the spring being attached to the trip arm 23 thus tending to hold such trip arm at right angles with the track so that it will be in line to come in contact with passing cars, and also to bring such trip arm back to its normal position after it has been operated on by a passing car or cars.

Having mentioned in detail the several parts of our device we will now describe its operation, which is as follows: The door being closed and the parts in the position shown in Fig. 1, upon a car coming toward the door on the track 2 from either direction the side of the car will come in contact with the end of the trip arm 23 turning such trip arm on its pintle 16 toward the door. As the arm turns on the pin 16 the lug or projection 21 on its under side will engage with one end of the recess or slot in the hub of the lever 14 also mounted on the pin 16 and will therefore turn such lever outward and in a direction away from the track 2; thus through the link 13 moving the crank 12 and turning the shaft or rod 6. The shaft 6 being connected to the door 3 through the arm 9 and link 10 when the shaft is turned as aforesaid the door will be opened. When the tripping mechanism on one side of the door is operated and the door opened, through the movement of the shaft 6 the mechanism on the opposite side of the door will be simultaneously operated with the exception of the trip arm 23 which will still remain in its normal position for through the recess 20 in the hub of the lever 14 and the pin 16 on the hub of the trip arm 23 the trip arms can never be moved by the opening of the door, or one trip arm be moved by the operation of the other, while the door is operated, or opened and shut by the operation of either trip arm. This is explained in this way that when the parts of the tripping mechanism are in their normal position as shown in Fig. 1 the lug or projection 21 on the hub of the trip arm 23 is just in contact with the inner end of the recess or slot 20 in the hub of the lever 14 so that when the trip arm is operated on one side of the door it does not move the mechanism on the other side far enough to operate the other trip arm but just so far that the outer end of the recess or slot 20 in the hub of the lever 14 will come in contact with the lug 21 on the hub of the trip arm 23. After the car or cars pass, the first trip arm will be brought back to its normal position by the spring 26, but the tripping mechanism will be unaffected and the door will remain open until the car or cars strike and move the other trip arm when the door will be closed, the mechanism operating in closing the door precisely the same as in the opening except in an opposite direction, and when the car or cars have passed the second trip arm it will be brought back to its normal position at a right angle to the track by its spring 26 so the parts will be again in the position shown in Fig. 1.

In Fig. 3 the parts of the right hand tripping mechanism are shown in their normal position when the door is closed, the tripping lever being moved outward against the tension of its spring to show the slot 20 and lug 21.

Our door and tripping mechanism is very simple in construction and has but very few parts and these are so constructed as to not be liable to get out of order.

The entire mechanism is above ground and therefore not affected by water in the mine, or coal or refuse dropping on it and clogging the parts. It is perfect in operation being positive and direct.

Should at any time a car operate one of the trip arms and open the door, whether it goes through the door or returns the way it came, it must operate one of the trips and thus close the door.

When miners pass through the door and partly open it, should they leave it partly open the weight of the lever 9 is sufficient to close the door, there being so little resistance and friction in the few parts that go to make up the tripping mechanism.

It is obvious that many changes may be made in our device without departing from the spirit of our invention, as for instance weights could be used to hold the trip arms at right angles to the track instead of springs, and the result would be precisely the same.

Having fully set forth our invention, what we claim, and desire to secure by Letters Patent of the United States, is—

1. In a trip for mine trap doors a trip arm loosely mounted on a pin or pintle on each side of the door, the end of each of such arms in the path of passing cars, and a lever also loosely mounted on each of said pintles and connected with mechanism for opening and shutting the door, such lever adapted to be engaged by said trip arm substantially as set forth.

2. In a trip for mine trap doors a trip arm loosely mounted on a pin or pintle on each side of the door the end of each of said arms in the path of passing cars, a lever also mounted on each of said pintles and connected with mechanism for opening and shutting the door, and a lug on each of the trip arms working in a recess in its lever whereby at certain times the two move together substantially as set forth.

3. In a trip for mine trap doors, a trip arm loosely mounted on a pin or pintle, on each side of the door, means connected with each of such arms for holding them at right angles to the track and their ends in the path of passing cars, and a lever also loosely mounted on each of said pintles and connected with mechanism for opening and shutting the door, each of such levers adapted to be engaged by its trip arm, substantially as set forth.

4. In a trip for mine trap doors, a trip arm loosely mounted on a pin or pintle on each side of the door, springs connected with each of such arms and holding their ends in the path of passing cars, a lever also loosely mounted on each of said pins and connected with mechanism for opening and shutting the door, and a lug formed on each of said trip arms and a recess or slot in each of said levers whereby the levers are adapted to be operated by said trip arms and the door opened and shut, substantially as set forth.

In testimony whereof we affix our signatures in presence of two witnesses.

GEORGE J. HERTH.
GEO. BONENBERGER.

Witnesses:
CHARLES L. ROBERTS,
EMIL W. SAUPERS.